July 5, 1966  W. D. HIBBARD  3,259,336
COIL WINDING MACHINE

Filed April 8, 1964  4 Sheets-Sheet 1

INVENTOR
WILLIAM D. HIBBARD

BY

*Morsell & Morsell*
ATTORNEYS

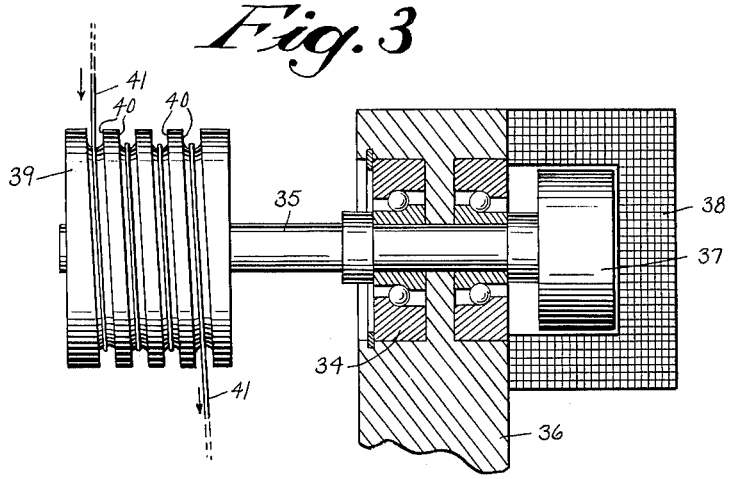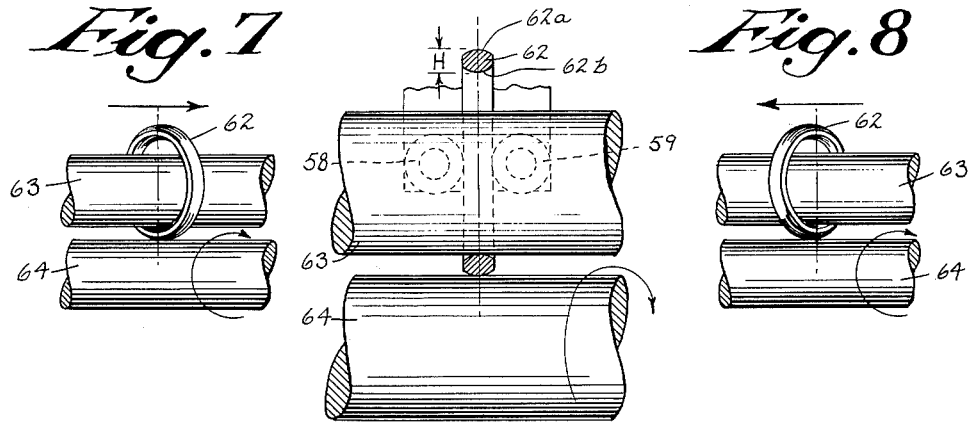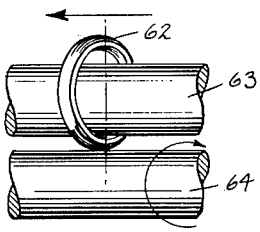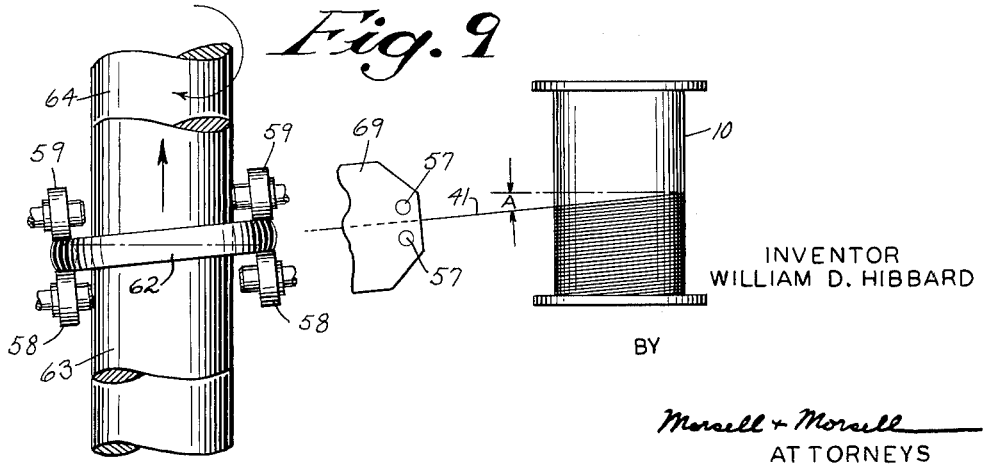
INVENTOR
WILLIAM D. HIBBARD
BY
Morrell + Morrell
ATTORNEYS

INVENTOR
WILLIAM D. HIBBARD

BY

Morrell & Morrell
ATTORNEYS

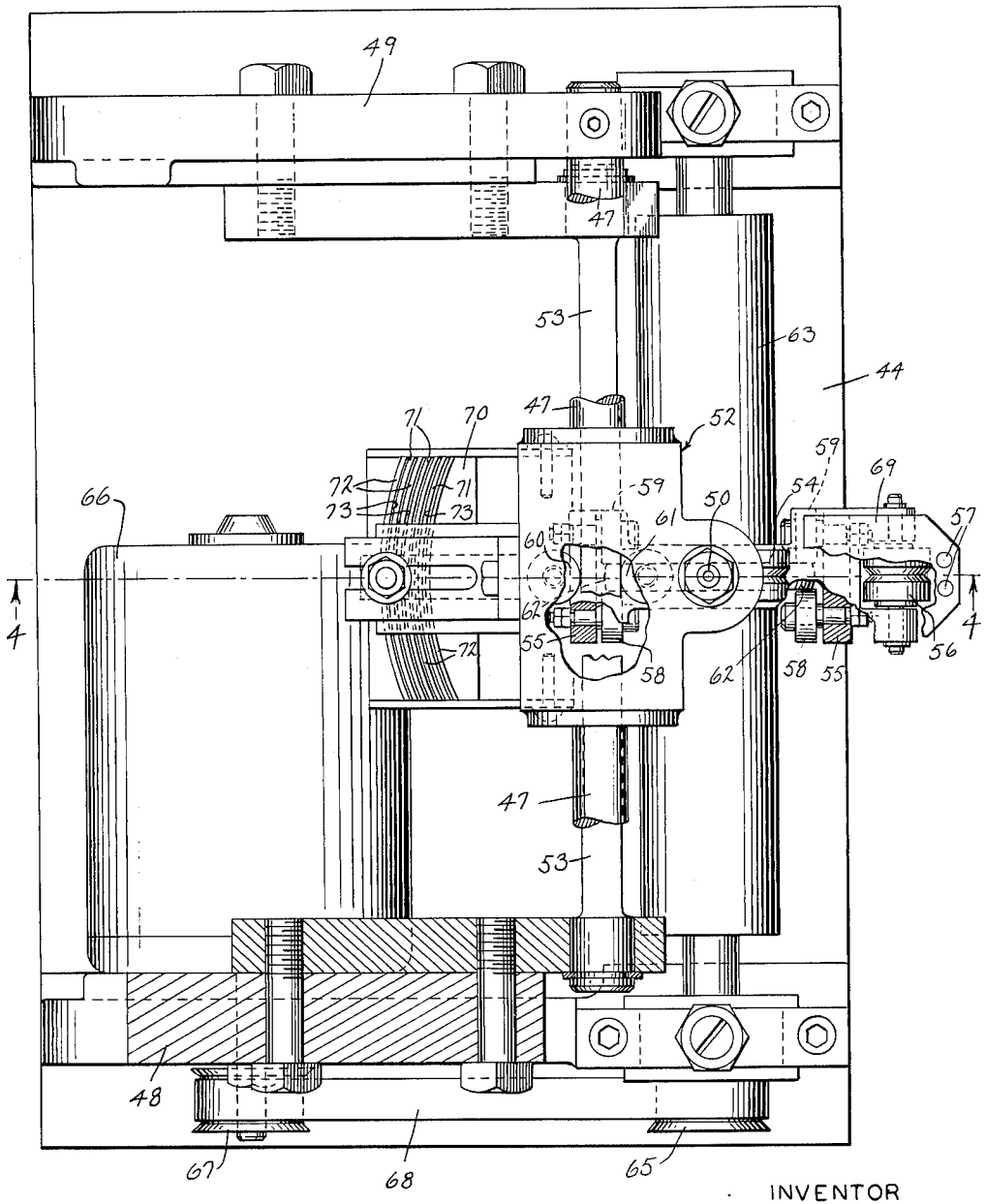

Patented July 5, 1966

3,259,336
COIL WINDING MACHINE
William D. Hibbard, Milwaukee, Wis., assignor to Automation Machines & Equipment Co., Inc., Milwaukee, Wis., a corporation of Wisconsin
Filed Apr. 8, 1964, Ser. No. 358,256
8 Claims. (Cl. 242—158)

This invention relates to improvements in coil winding machines, and more particularly to a coil winder having novel means for winding the wire in uniform, level layers.

In the winding of coils for use in electric motors, relays, transmitters, transformers, etc., considerable difficulty is encountered in maintaining uniformity in the layers of wire on the coil, particularly inasmuch as even slight variations in the diameter of the wire produce substantial irregularities in the coil layers and result in coils of non-uniform electric inductance. Such diameter variations in the wire are frequently caused by stresses or stretching of the wire during the manufacturing process, and is particularly common in coated wire. Heretofore, attempts have been made to provide means for maintaining the coil layers uniform and level, but none of said prior devices has proved entirely satisfactory for its intended purpose. With this in mind, the principal object of the present invention is to provide an improved coil winding machine having a novel wire guiding mechanism which ensures level coil layers regardless of irregularities in the wire being wound, thereby providing coils of uniform electrical characteristics.

A more specific object of the present invention is to provide a novel wire feed and guiding unit for a coil winding machine which is designed to automatically follow the coil being wound at a variable rate dependent upon the progression of the wire as it turns, variations in the wire dimensions, and resulting deviation in the angle of the wire as it leads to the coil, causing an automatic adjustment in the traversing rate of the feed unit to compensate therefor and to maintain uniformity in the coil winding.

Further objects of the invention are to provide an improved coil winding machine which permits precision winding at high speeds, and which permits complete automation of the coil manufacturing operation.

A further object is to provide a coil winding machine having a novel wire feed and guiding mechanism which does not have to be adjusted or reset for wire of different gauges.

Still further objects of the present invention are to provide an improved coil winder which is simple and reliable in operation, which is relatively inexpensive in design and construction, and which is otherwise particularly well adapted for its intended purposes.

With the above and other objects in view, which other objects and advantages will become apparent hereinafter, the invention comprises the novel coil winding machine described in the following specification and all of its parts and combinations, and all equivalents thereof as may come within the spirit of said invention and within the scope of the appended claims.

In the accompanying drawings, illustrating a preferred embodiment of the invention, and wherein the same reference numerals designate the same parts in all of the views:

FIG. 3 is an elevational and vertical sectional view, taken on line 3—3 of FIG. 1, showing the wire-tensioning mechanism employed in the machine;

FIG. 5 is a top plan view of the wire-guiding apparatus;

FIG. 6 is a fragmentary front elevational and sectional view of the novel follower ring mechanism utilized in the wire-guiding apparatus;

FIG. 7 is a diagrammatic front elevational view showing the follower ring as it moves in one axial direction on its shaft mounting;

FIG. 8 is a diagrammatic elevational view illustrating the position of said follower ring when it travels in the opposite axial direction; and FIG. 9 is a top plan view, in simplified and exaggerated form, showing the relative positions of the bobbin, wire, and guide mechanism during the winding operation.

Figure 1:
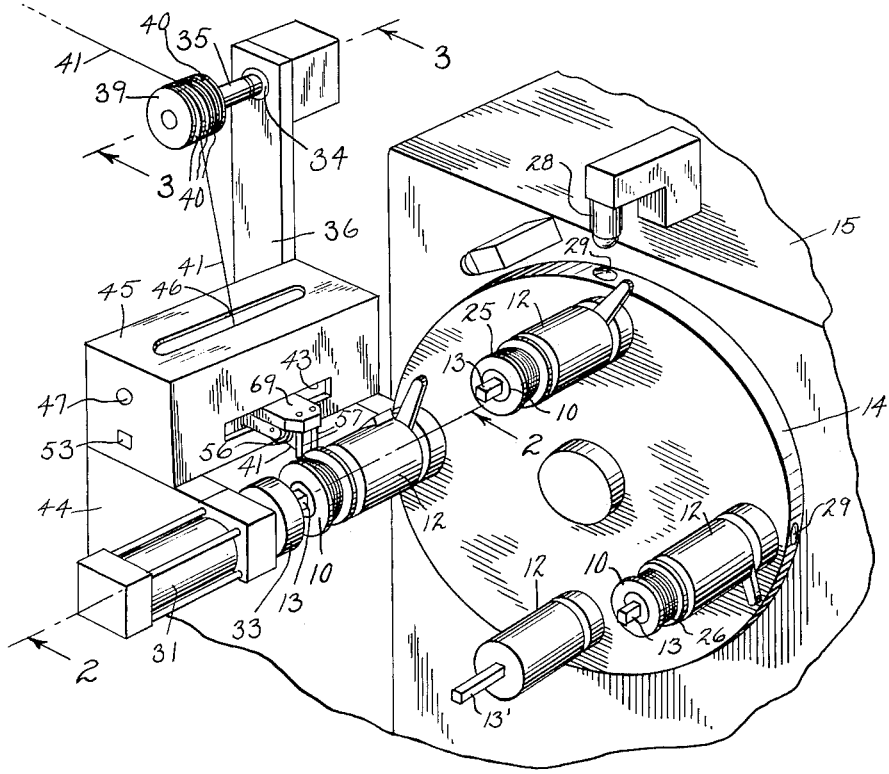
FIG. 1 is a fragmentary perspective view of the coil winding machine comprising the present invention.
Figure 2:
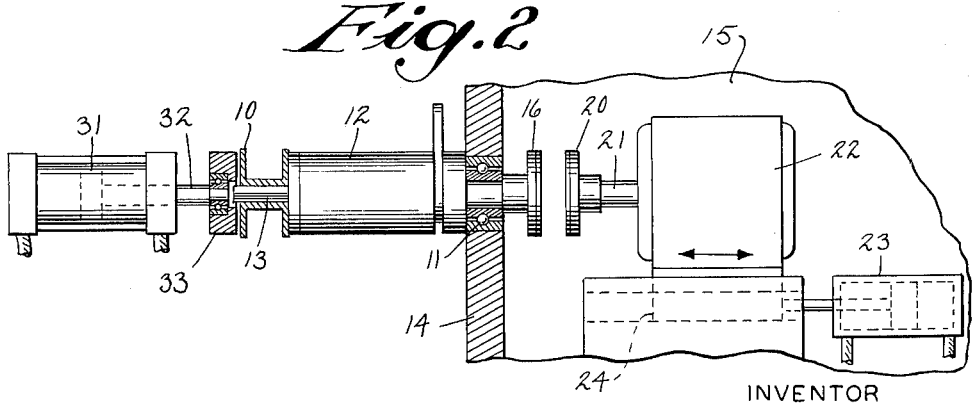
FIG. 2 is an elevational and vertical sectional view, taken along line 2—2 of FIG. 1, showing the bobbing mounting and driving assembly.

Referring now more particularly to FIGS. 1 and 2 of the drawings, the spool or bobbin 10 on which the wire is to be wound to form an electrical coil is removably mounted on a squared, rotatable mandrel 13 projecting from a cylindrical fixture 12 mounted on an indexing disk 14, there preferably being four or more of said mandrel units spaced around said disk. Said indexing disk 14 is rotatably carried on a housing 15, there being a suitable bearing assembly 11 therefor, and fixed on the inner end of the mandrel shaft within said housing is a clutch plate 16 (FIG. 2) which is drivably engageable by a clutch plate 20 on the drive shaft 21 of an electric motor 22. Said motor is movable on a track 24 into and out of driving engagement with said mandrel plate 16 through the actuation of a pneumatic cylinder and ram 23. Any other suitable clutching mechanism may be employed.

In the operation of the illustrated machine, and referring again to FIG. 1, the indexing disk 14 is suitably rotated 90° to bring a bobbin 10 into winding position, while simultaneously advancing finished coils 25 and 26 to a position or station where they can be conveniently removed, and advancing the empty mandrel 13' to the next station to receive a bobbin. Said indexing mechanism may include a solenoid-actuated plunger 28 releasably engageable with notches 29 in the disk to ensure the accurate positioning of said disk.

With the bobbin 10 positioned as shown, the end of the wire is secured in the starting slot in the bobbin end flange, as is well known in the art, and the motor 22 is moved into engagement with the mandrel clutch plate 16 to rotate said bobbin and to thereby wind the wire therearound, as will be hereinafter described in greater detail. When the coil has been wound with the desired number of turns, as may be determined by a suitable counter device, the winding operation is manually or automatically halted and wire leading from the supply reel to the finished coil is cut as the coil is advanced to the next station, and the free end of the wire is taped on said coil.

In order to firmly support and brace the bobbin 10 during the winding operation, the illustrated machine is provided with an air cylinder 31 having a ram 32, and carried on the end of said ram is a freely rotatable disk 33 adapted to bear against the outer end of the bobbin when said ram is extended, there being a recess in the outer end of the disk to receive the projecting end of the mandrel. Thus, means are provided to brace the bobbin and to prevent it from working loose or out of alignment during rotation.

Referring now to FIGS. 1 and 3, the present machine is provided with an adjustable electrical brake mechanism for maintaining the desired tension on the wire during the winding operation. Said mechanism includes a rotatable shaft 35 supported by a standard 36, there beng a suitable bearing assembly 34 (FIG. 3), and carried on the inner end of said shaft is an armature 37 which is designed to rotate in the magnetic field set up in surrounding coils 38. Mounted on the outer, projecting end of said shaft 35 is sheave 39 having a plurality of helical grooves 40, and the wire 41 which leads from a reel or other supply source (not shown) is wound around said sheave several times. Depending upon the strength of the magnetic field set up in the coils 38, there is a predetermined drag on the armature 37 and rotating shaft 35 which restricts the rotation of the sheave 39 and maintains a desired tension on the wire. It is important during the winding operation that the correct wire tension be maintained, and it has been found that the adjustable hysteresis brake-type mechanism illustrated performs excellently in this respect.

Figure 4:
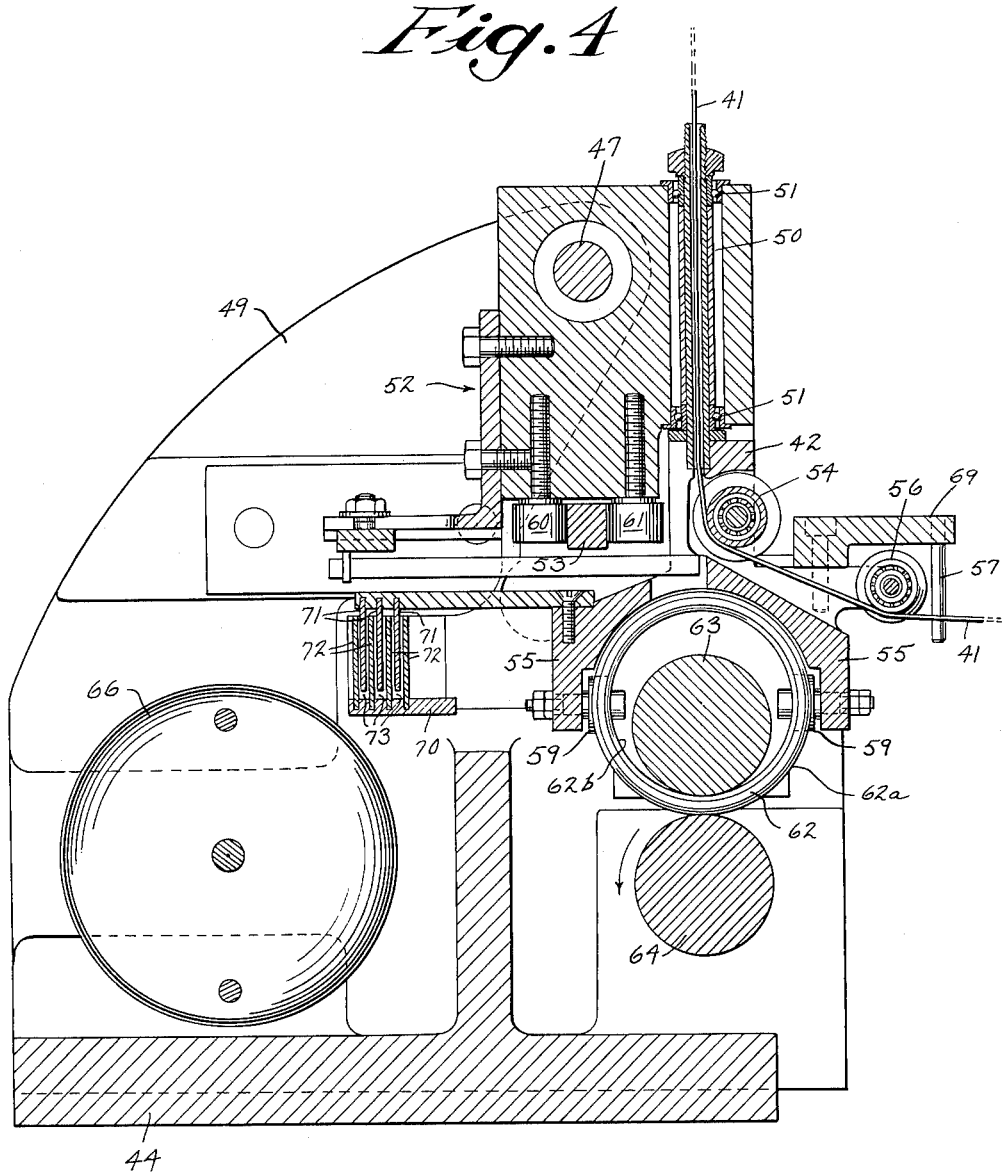
FIG. 4 is a vertical sectional view taken on line 4—4 of FIG. 5 through the wire-guiding apparatus featured in the invention.

It will be seen in FIG. 1 that from the tensioning device hereinabove described, the wire 41 is directed into a slotted top opening 46 in a housing 45. Within said housing is a horizontal shaft 47 (FIGS. 4 and 5) extending between a pair of side members 48 and 49 on main frame 44, and movably carried within said housing is the novel wire guide mechanism characterizing the present invention, and which is illustrated in FIGS. 4 and 5.

Said wire guiding apparatus includes a traversing carriage 52 which is longitudinally slidably mounted on the aforementioned horizontal shaft 47 and on a guide bar 53 extending between the side members below and parallel with said shaft, said carriage being provided with rollers 60 and 61 which bear against opposite sides of said bar 53 to guide and stabilize said carriage during movement. As best appears in FIG. 4, a vertical pivot tube 50 is rotatably mounted within said carriage, there being bearing means 41 therefor, and the wire 41 from the supply source is directed into and through said tube.

The lower end of said rotatable tube 50 is designed to support a wire guiding swivel unit which includes a leg 42 depending from the lower end of said pivot tube and a forwardly-projecting plate 69, there being an elongated slot 43 in the front wall of the housing 45 (FIG. 1) through which the latter member projects for movement in the slot. Rotatable in said depending leg 42 is a sheave 54 under which the wire 41 is trained after it leaves the lower end of said pivot tube, and said wire is then trained under an outer guide sheave 56 and thence between a pair of depending pins 57 carried by said forwardly-projecting plate 69, the wire then extending to the bobbin, as described.

Rigidly carried by and projecting below the leg 42 is a yoke 55 (FIG. 4) carrying pairs of rollers 58 on one side and 59 on the other. Carried within said yoke is a drive ring 62 which is rotatable between said pairs of rollers, and as appears in FIG. 6, said ring has convex inner and outer peripheral portions 62a and 62b, the curvature of which has a greater radius than $H/2$, referring to FIG. 6. Said drive ring is mounted between an idler shaft 63 which extends therethrough, and a horizontal drive shaft 64 which is positioned below and parallel with said idler shaft, said drive shaft having a sheave 65 (FIG. 5) on its outer end. Suitably mounted on the frame rearwardly of said carriage 52 is an electric motor 66 having a drive sheave 67 which is connected by a belt 68 with the sheave 65, thus providing means for rotatably driving the shaft 64.

In operation, when the motor 66 is operated, the shaft 64 is rotatably driven thereby, and said shaft rotates the ring 62 in the opposite direction, the idler shaft 63 rotating with said ring. In normal operation the drive shaft is driven at a constant speed in a single direction. When said ring is in a plane at a right angle to the shaft axes, as shown in FIG. 6, it rotates as described, but it does not travel axially of said shafts. When said ring is swiveled in either direction from its centered position, however, and as is illustrated in FIGS. 7 and 8, the coaction of the rotating shafts 63 and 64 with curved inner and outer peripheral surfaces of the ring causes said ring to move axially on said shafts in the direction it is swiveled, the axial travel speed of said ring being directly proportional to the amount of deviation thereof from its centered position. This is a critical element in the present invention, as will be seen. The axial speed of said ring is also dependent upon the speed of rotation of the shaft 64, of course, but the latter is ordinarily pre-set for particular winding operations.

As mentioned, the ring 62 is rotatably retained within the yoke 55 by means of two pairs of rollers 58 and 59, there being a pair on each side of the ring as shown, and said yoke is not only movable longitudinally with the carriage on the shaft 47, but said yoke and ring can be swiveled about the vertical axis provided by the pivot tube 50, as described. During the coil winding operation the wire on the bobbin is always wound in a helix of restricted pitch, so that the wire turns on the coil will be as close together as possible. Consequently, the portion of the length of wire extending between the carriage pins 57 and the coil is necessarily at an angle, as dictated by the pitch of the coil, rather than perpendicular to the coil axis, and therefore the wire guiding carriage lags somewhat behind the wire being wrapped around the coil. This relationship is shown in exaggerated form in FIG. 9 of the drawing. The angle of the wire, relative to a plane exactly perpendicular to the coil axis, is designated by the letter A and will be hereinafter referred to as the lag angle.

Due to the swivel mounting of the carriage portion including the yoke 55, the lag angle of the wire tends to turn said yoke from its normal straight position and causes it, together with the ring 62 carried therein, to swivel in a direction to conform to the pitch on the bobbin layer. As hereinabove described, due to the coaction of the rotating shafts 63 and 64 with the curved peripheral portions of the drive ring, the turning or swivel movement of said ring causes the same to travel axially on said shafts. As said ring 62 travels axially it bears against the yoke rollers 58 or 59 on one side or the other and pushes the yoke and the entire longitudinally-movable carriage axially therewith, thus causing said carriage to follow along with the wire being wound as dictated by the winding of the wire on the bobbin.

In the event an irregularity or defect in the wire causes a deviation in the relative positions of the yoke and the wire turn being wound, the change in lag angle causes a corresponding change in the swivel angle of the follower ring 62, thus causing said ring to automatically change its axial travel speed sufficiently for said carriage to again assume the proper position relative to the wire being turned. The result is that with the present invention deviations in the wire are immediately automatically compensated for, and the finished coils are relatively level and even.

When the wire reaches the end of the bobbin, it engages the end flange thereof and laps on itself. The resultant reaction force due to the lapping of the wire on itself causes a reverse swivel movement of the carriage yoke after the carriage has traveled a sufficient distance in its original direction to make up for the lag, thereby reversing the pitch of the wire being wound. The drive ring 62 will then swivel to a reverse angle and commence traveling in the opposite axial direction on its shaft mounting. When the coil has been wound with the desired number of turns, the winding operation is halted, the wire cut, and the coil is indexed to the next station, as hereinbefore described. Inasmuch as the traversing carriage in the present machine is free-riding on its shaft mounting, it may be readily manually or mechanically shifted to its starting position for the next bobbin.

It is to be understood that the diagrammatic showings in FIGS. 7, 8 and 9 have been exaggerated in order to clearly illustrate the operation of the present guide mechanism. In actual practice, the pitch of the wire turns, and the corresponding lag angle of the wire as it is fed to the bobbin is small. Nevertheless, even small variations in wire diameter and resulting deviations from the desired helix angle can result in uneven layers and faulty coils. Unlike conventional coil winding machines, however, wherein the traversing carriage moves at a constant speed and cannot compensate for such deviations, the present wire-guiding mechanism is designed to follow with the wire as the same is wrapped on the coil, rather than to lead the wire onto the coil. Consequently, with the present machine, any wire irregularities are immediately reflected in the lag angle, thus causing an automatic adjustment in the carriage travel rate to compensate therefor, as described. The result is finished coils which are level and even, and which are characterized by uniform electrical qualities.

Referring again to FIGS. 4 and 5 of the drawing, it will be seen that the yoke has a rearwardly-extending portion 70 which is provided with a plurality of concentric arcuate, downwardly-extending vanes 71 which fit between spaced, arcuate vanes 72 projecting upwardly from the carriage proper. Said upwardly-projecting vanes are the dividers of upright receptacles 73 which contain a viscous damping compound, such as liquid silicon. Thus, any movement of the swivel yoke in response to transient forces will be resisted, thereby minimizing undesirable fluttering of the yoke during the winding operation.

From the foregoing detailed description, it will be seen that the present invention provides a coil winding machine having a novel and improved wire-guiding mechanism which ensures level coil layers regardless of irregularities in the wire being wound, thus providing coils of uniform inductance. Moreover, the present machine is adapted to operate accurately at high speeds, it does not have to be adjusted or reset for wire of different gauges, and it is readily adaptable to complete automation.

It is to be understood that the invention is not to be limited to a machine including all of the exact structural details illustrated and hereinabove described. On the contrary, it is contemplated that modifications or changes may be made therein, and it is intended to include not only the illustrated structure but also any and all modifications or changes as may come within the spirit of said invention, and within the scope of the following claims. In said claims it is intended that the word "wire" include any flexible elongated member to be wound.

What I claim is:

1. A coil winding machine, comprising: a driven mandrel for supporting and rotating a bobbin to wind a wire therearound; a carriage; means supporting said carriage for movement in a direction parallel to the axis of the bobbin; a guide member swivelly mounted on said carriage, said guide member being adapted to guide wire from a source and to direct it onto the bobbin in a helix, said guide member being adapted to swivel responsive to the angle of the wire as it is wound on the bobbin; a drive shaft extending parallel to the axis of the bobbin; a rotatable idler shaft adjacent and parallel to said drive shaft; and a follower ring having convex inner and outer peripheral surfaces rotatably carried by said swivel guide member, said ring encircling said idler shaft and being drivably engaged by said idler and drive shafts in a manner whereby said ring will travel axially on said shafts in a direction it is swiveled with said guide member responsive to the angle of the wire being wound, and said ring moving said guide member and carriage axially of the bobbin at a speed directly proportional to the swivel angle of said ring as dictated by the angle of the wire being wound.

2. The coil winding machine recited in claim 1 wherein said ring is rotatably carried by a yoke swivelly mounted on and depending from said carriage, said yoke having pairs of rollers on opposite sides of said ring, whereby axial movement of said ring responsive to the angle of the wire being wound causes said ring to bear against the rollers on one side thereof to move said yoke and carriage axially of the bobbin.

3. The coil winding machine recited in claim 2, and having cooperating means on said carriage and said yoke for damping undesired swivel movement of said yoke caused by transient forces during the winding operation.

4. The coil winding machine recited in claim 3 wherein said damping means includes a receptacle on said carriage having a viscous liquid substance therein, and a plurality of vanes on said yoke projecting into said receptacle and movable through said viscous substance during swivel movement of said yoke.

5. The coil winding machine recited in claim 1, and having adjustable means for maintaining a desired tension on the wire delivered to said guide member during the winding operation.

6. In a coil winding machine having a driven mandrel for supporting and rotating a bobbin, a carriage, means supporting said carriage for free sliding movement in a direction generally parallel to the axis of the bobbin, a guide member through which wire is guided to the bobbin mounted for swiveling movement on said carriage on an axis which is so disposed as to provide for pivoting of the guide member in response to the angle of the wire extending between said guide and bobbin, a pair of parallel and adjacent shafts rotatably supported to extend parallel to the direction of movement of the carriage, a rotatable ring through which one of said shafts extends and having convex inner and outer peripheral surfaces, the relationship of said two shafts with one another and with said ring being such that the convex inner surface of the ring is engaged by that shaft which extends through the ring and the convex outer peripheral surface by the other shaft in a manner whereby said ring can swivel and will travel axially on said shafts as it is rotating in a direction in which said ring is swiveled, means between said ring and guide member for moving said guide member and carriage axially of the bobbin at a speed directly proportional to the swivel angle on said ring as dictated by the angle of the wire being wound, and means for driving one of said shafts.

7. The coil winding machine recited in claim 6 in which there is a rotatably supported sheave shaft, a sheave rigid on said shaft and around which wire which is being fed to the guide member is wrapped at least once, and electric brake means coacting with said sheave shaft for maintaining a desired tension on the wire during the winding operation.

8. The coil winding machine recited in claim 6 wherein the means between said ring and guide member includes a yoke depending from said guide member, said yoke having pairs of rollers on opposite sides of said ring, whereby axial movement of said ring responsive to the angle of the wire being wound causes said ring to bear against rollers to move said yoke and carriage axially of the bobbin as the ring is rotating.

References Cited by the Examiner

UNITED STATES PATENTS

| 2,251,205 | 7/1941 | Revel | 242—11 X |
| 2,539,667 | 1/1951 | King | 242—158.4 |
| 2,845,229 | 7/1958 | Bliss | 242—158.4 X |
| 2,987,268 | 6/1961 | Haugwitz | 242—158.4 |
| 2,989,256 | 6/1961 | Lee | 242—9 |
| 3,031,153 | 4/1962 | Attwood et al. | 242—158 |

FOREIGN PATENTS 1,023,720   12/1952   France.

STANLEY N. GILREATH, *Primary Examiner.*